United States Patent [19]

Le Brasseur

[11] 4,028,480

[45] June 7, 1977

[54] PHOTODEGRADABLE POLYMER COMPOSITIONS

[75] Inventor: Genevieve Le Brasseur, Bully les Mines, France

[73] Assignee: Societe Chimique des Charbonnages - CdF Chimie, Paris, France

[22] Filed: Apr. 15, 1976

[21] Appl. No.: 677,377

[30] Foreign Application Priority Data

Apr. 17, 1975 France .............................. 75.12000

[52] U.S. Cl. ...................................... 526/3; 526/4; 526/5; 260/DIG. 43
[51] Int. Cl.² .......................................... C08J 3/20
[58] Field of Search ................ 260/DIG. 43; 526/3, 526/4, 5

[56] References Cited

UNITED STATES PATENTS

| 3,830,764 | 8/1974 | Hudgin et al. .............. | 260/DIG. 43 |
| 3,882,058 | 5/1975 | Le Brasseur et al. ...... | 260/DIG. 43 |

FOREIGN PATENTS OR APPLICATIONS

| 770,202 | 1/1972 | Belgium ..................... | 260/DIG. 43 |
| 1,342,622 | 1/1974 | United Kingdom ........ | 260/DIG. 43 |

Primary Examiner—Eugene C. Rzucidlo
Attorney, Agent, or Firm—Finnegan, Henderson, Farabow & Garrett

[57] ABSTRACT

Photodegradable polyethylene or polystyrene compositions of copolymers thereof containing up to 500 ppm of iron in the form of a ferrous carboxylic acid salt having a substituted alkyl chain of at least 6 carbon atoms.

6 Claims, No Drawings

PHOTODEGRADABLE POLYMER COMPOSITIONS

The present invention relates to photodegradable polymer compositions containing a ferrous salt of a carboxylic acid.

With the every increasing attention being paid to environmental pollution problems there has become a critical need for film forming polymer compositions that can be used as durable packaging materials, but that will quickly degrade in the outdoor environment and particularly under the influence of ultraviolet light or sunlight.

Many different additives, such as metal salts or complexes, have been proposed in the past for use with polymers such as polyethylene and polystyrene in an attempt to improve their degradation properties without affecting their durability as packaging materials. None of the additives, however, have been able to provide the proper balance between the properties desired in the final product. For example, ferric iron salts of carboxylic acids have been proposed for use in the past as photodegradable additives for polyethylene films, but and as more fully shown in the accompanying examples, these additives have not proven entirely satisfactory in achieving an acceptable rate of outdoor degradation while retaining durability for packaging purposes.

The present invention therefore relates to the use of certain new and novel additives having advantageous properties compared to those additives previously proposed. More particularly, the present invention relates to photodegradable polymer compositions comprising at least one polymer selected from the group consisting of polyethylene and polystyrene and copolymers thereof and from 1 to 500 ppm relative to the polymer of (iron-II) in the form of a salt from a carboxylic acid having an alkyl chain containing at least 6 carbon atoms and being substituted in positions 2, 3, 4 or 5 relative to the acid group in position 1, with at least one radical selected from the group consisting of carboxylic acid, sulphonic acid, alcohol and amide radicals. Preferably the ferrous iron is used in an amount of from 10 to 150 ppm based on the amount of the polymer.

It is to be understood that both the foregoing general description and the following detailed description are exemplary and explanatory but are not restrictive of the invention.

Exemplary of polymers which can be used in the present invention are polyethylene, polystyrene, and copolymers based on ethylene or styrene, such as, for example, copolymers of ethylene with vinyl acetate, vinyl chloride, methyl vinyl ether, ethyl vinyl ether, acrylonitrile, acrylic esters, carbon monoxide and sulphur dioxide or copolymers of styrene with acrylonitrile-butadiene, and mixtures of the polymers and copolymers defined above.

Conventionally, the polymer can also contain other additives such as antioxidants, slip agents and the like.

Exemplary of the ferrous iron salts that can be used in the present invention are iron-(II) dodecylsuccinate, iron-(II)O-palmitoyl-1-ascorbate, iron-(II) monolaurylethanolamide sulphosuccinate, iron-(II) monostearylsulphosuccinate, iron-(II) N-palmitoylglutamate, iron-(II) N lauroylaspartate, iron-(II) 2-sulphopalmitate and iron-(II) O-palmitoylgluconate.

The ferrous salts can be prepared, for instance, by the action of the corresponding acid on freshly prepared ferrous carbonate in the absence of air, or by double decomposition, in air, of a salt of the acid (for example the potassium salt) with ferrous alum. If necessary, the acids can be prepared by the action of an acid chloride on an alcohol-acid or on an amino-acid in a pyridine medium.

These ferrous salts have been found to have particularly valuable properties when used as additives with the polymers of the present invention because they are compatible with, and easily dispersible in, the polymers, particularly because of the long alkyl chain in the acid salts. They do not have a heat-degrading action on the plastics during the production of the polymer compositions or during the thermoplastic processing of these compositions. This property is probably due to the presence of at least one of the defined substituents in positions 2, 3, 4, or 5 on the alkyl chain, which substituent is believed to have a complexing action on iron-(II) and is also responsible for the storage stability of the additive. For example, in the presence of a 100 ppm of ferrous iron according to the present invention, a degradation of a 40μ thick polyethylene film exposed to outdoor sunlight was completed within about 100 days.

These ferrous iron salts are particularly active in inducing the photo-chemical degradation of the polymers to which they are added, while at the same time are non-toxic which allows the compositions to be used with foodstuffs and they are also not water-extractable.

Of course it is impossible, according to the invention, to regulate the photo-chemical degradability of the polymers by regulating the amount of the additive introduced into the polymer compositions. Experiments have established that the photo-chemical degradability of the polymers increases progressively with the concentration of the additive until the latter reaches an optimal value depending on the molecular absorption coefficient of the additive and the thickness of the irridated object. Beyond this value, the increase in degradability tends to decline markedly.

Preferably sulphur, in the form of sulphur or polysulphide, is used in the compositions of the present invention with the ferrous additive to delay initial photodegradation of the polymer compositions. The sulphur content is generally between 1 and 250 ppm and preferably between 10 and 100 ppm relative to the polymer.

The compositions may be prepared by hot mixing the polymer with the additive or additives until a homogeneous mixture is obtained by conventional techniques.

To illustrate the invention more specifically, reference is made to the following examples. These examples illustrate the preparation of polymer compositions containing various ferrous iron carboxylic acid salts according to the present invention, their photodegradability, as well as their comparison with control samples containing no additive and some control samples containing additives of the prior art.

The examples are merely illustrative and are to be understood as not limiting the scope and underlying principles of the invention in any way.

EXAMPLE 1

A polymer composition is prepared by intimate hot mixing of virgin polyethylene having a density of 0.92 and a melt index of 1.9 with 100 ppm of iron-(II) in the form of dodecylsuccinate as the ferrous additive.

The composition obtained is then converted to a film of about 500 microns thickness and samples of the film are irradiated for varying periods in a "Weather-O-meter" of the ATLAS 600 type, which is a well-known apparatus making it possible to carry out accelerated aging under ultraviolet radiation.

The action of the additive is assessed by subjecting the product obtained to a tensile test which makes it possible to determine the decrease (in %) of the elongation at break of the sample relative to the sample before irradiation.

A control sample film is also prepared using the same polymer, but without any additive. After 208 hours, it was found that the control film sample had only decreased by 4% in elongation at break, whereas the film containing the ferrous additive had achieved a decrease of 22% after 100 hours; 55% after 200 hours, and 95% or practically complete degradation after 300 hours. The results are repeated below in Table I.

EXAMPLES 2–15

The procedure of Example 1 is repeated in each of Examples 2–15 in all respects except that varying amounts of the same and different ferrous carboxylic acid salts are used and sometimes together with varying amounts of sulphur.

The same test as described in Example 1 is conducted on each of the films. The compositions of the films and the results of the tests in each example are reported below in Table 1.

EXAMPLE 16

A comparative example is carried out to illustrate the influence of the alkyl chain having more than 6 carbon atoms with respect to a similar ferrous compound containing an alkyl chain of 6 or less carbon atoms. In this example, the ferrous compound is 100 ppm of iron-(II) in the form of gluconate which is added to the same polyethylene as that used in Example 1.

The film product obtained is irradiated and the decrease, in %, of the elongation at break, is measured by the same test as shown in Example 1. The film was irradiated for 213 hours and the decrease was only 13%.

The example is repeated using iron-(II) succinate as the ferrous additive and after being irradiated for 196 hours, the decrease was only 10%.

EXAMPLE 17

This example is carried out to demonstrate the effect of the valency of the iron in the additive. The example is similar to Example 1 except ferric iron compounds are used as the additive.

In this example, otherwise similar to Example 1, 100 ppm of iron-(III) in the form of glycerophosphate is used as the additive. After 200 hours of irradiation, the film product had a decrease in elongation of 16%.

The example is repeated using sodium ferricitrate and sodium ferritartrate as the additive. The elongation at break was 2 and 3%, respectively.

TABLE I

| Example No. | Ferrous Additive | ppm of iron II | ppm of Sulphur | duration of irradiation | decrease, in %, in the elongation at break |
|---|---|---|---|---|---|
| CONTROL | NONE | 0 | 0 | 208 hrs. | − 4% |
| 1 | Iron-(II) dodecylsuccinate | 100 | 0 | 100 hrs. | −22% |
| | | | | 200 hrs. | −55% |
| | | | | 300 hrs. | −95% |
| 2 | Iron-(II) dodecylsuccinate | 100 | 10 | 100 hrs. | + 5% |
| | | | | 200 hrs. | − 5% |
| | | | | 300 hrs. | −82% |
| | | | | 400 hrs. | −85% |
| 3 | Iron-(II) dodecylsuccinate | 100 | 50 | 100 hrs. | −15% |
| | | | | 200 hrs. | −12% |
| | | | | 300 hrs. | −65% |
| | | | | 400 hrs. | −80% |
| 4 | Iron-(II) dodecyulsuccinate | 100 | 100 | 100 hrs. | −24% |
| | | | | 200 hrs. | −47% |
| | | | | 300 hrs. | −80% |
| 5 | Iron-(II) - O-palmitoyl-1 ascorbate | 100 | 0 | 100 hrs. | −30% |
| | | | | 200 hrs. | −82% |
| | | | | 300 hrs. | −92% |
| 6 | Iron-(II) O-palmitoyl-1-ascorbate | 200 | 0 | 100 hrs. | −21% |
| | | | | 200 hrs. | −87% |
| 7 | Iron-(II) O-palmitoyl-1-ascorbate | 10 | 0 | 100 hrs. | −10% |
| | | | | 200 hrs. | −20% |
| 8 | Iron-(II) O-palmitoyl-1-ascorbate | 100 | 10 | 100 hrs. | +12% |
| | | | | 200 hrs. | + 3% |
| | | | | 300 hrs. | −11% |
| | | | | 400 hrs. | −15% |
| 9 | Iron-(II) O-palmitoyl-1-ascorbate | 100 | 50 | 100 hrs. | + 5% |
| | | | | 200 hrs. | −10% |
| | | | | 300 hrs. | −12% |
| | | | | 400 hrs. | −24% |
| 10 | Iron-(II) O-palmitoyl-1-ascorbate | 100 | 100 | 200 hrs. | −20% |
| | | | | 300 hrs. | −80% |
| 11 | Iron-(II) O-palmitoyl-gluconate | 100 | 0 | 204 hrs. | −91% |
| 12 | Iron-(II) N-palmitoyldiiminoacetate | 100 | 0 | 100 hrs. | −65% |
| | | | | 192 hrs. | −88% |
| | | | | 431 hrs. | −94% |
| 13 | Iron N-palmitoyl-glutamate | 100 | 0 | 204 hrs. | −90% |
| 14 | Iron-(II) monostearyl-succinate | 100 | 0 | 189 hrs. | −25% |
| 15 | Iron-(II) monolaurylethanolamide sulphosuccinate | 100 | 0 | 189 hrs. | −68% |

EXAMPLE 18

The good stability to thermal oxidation of polyethylene containing the additives of the present invention is demonstrated by this example. The property is demonstrated by studying the variation, as a function of time in minutes by calendering the sample at 180° C, of the melt index of the polyethylene having an initial melt index of about 2.

In this example, like in example 1, the polyethylene composition contained 100 ppm of iron-(II) in the form of dodecylsuccinate.

A control sample was also prepared using the same polyethylene, but without any additive.

The results of the study of the decrease in melt index as a function of time are reported below in Table II.

EXAMPLES 19-22

The procedure of Example 18 is repeated, using in Example 19, 100 ppm of iron-(II) in the form of O-palmitoyl-1-ascorbate; in Example 20, 100 ppm of iron-(II) in the form of dodecylsuccinate and 100 ppm of sulphur; in Example 21, 100 ppm of iron-(II) in the form of O-palmitoyl-1-ascorbate and 100 ppm of sulphur; and in Example 22, 100 ppm of iron-(III) in the form of tristearate.

In each example, the same polyethylene was used as that used in the control of Example 18.

The variation in the melt index as a function of time is reported below in Table II.

EXAMPLES 23 and 24

The aging experiment as described in Example 1 is repeated in these two examples, using as the polymer a vinyl acetate-ethylene copolymer containing 6.5% of vinyl acetate and having a melt index of 1.5. The copolymer did not contain any antioxidant. The ferrous iron additive was iron-(II) O-palmitoyl-ascorbate.

A control sample film was also prepared using the same copolymer composition but without any additive. The results of the aging tests are reported below in Table III.

TABLE III

| Example No. | Additive | ppm of iron | ppm of sulphur | duration of irradiation | decrease in elongation at break,—% |
|---|---|---|---|---|---|
| CONTROL | NONE | 0 | 0 | 196 hrs. | −28% |
| 23 | Iron-(II) O-palmitoyl-ascorbate | 100 | 0 | 180 hrs. | −86% |
|  |  |  |  | 412 hrs. | −97% |
| 24 | Iron-(II) O-palmitoyl-ascorbate | 50 | 0 | 180 hrs. | −48% |
|  |  |  |  | 412 hrs. | −93% |

EXAMPLE 25

This example is submitted to show the difference in action between a product according to the invention as demonstrated in Examples 5 and 10, and a product according to the prior art containing 100 ppm iron-(III) in the form of tripalmitate and 100 ppm sulphur. The decrease in the elongation at break, the oxygen content, and the weight content of $CHCl_3$ extractable substances (at 20° C) of molded plates of 500 $\mu$ thickness and of a polyethylene having a melt index of 2 and containing one of these additives is compared as a function of the duration of irradiation according to the aging test of Example 1.

The results obtained are listed below in Table IV.

TABLE IV

| Variables examined | Example | Duration of irradiation in the Weather-O-meter | | | | |
|---|---|---|---|---|---|---|
|  |  | 0 | 100 hrs. | 200 hrs. | 300 hrs. | 400 hrs. |
| Loss in elongation at break, % | 10 | 0 | 40 | 81 | 96 |  |
|  | 25 | 0 | 77 | 97 |  |  |
| Oxygen content mol/liter | 5 | 0.05 | 0.14 | 0.2 | 0.24 | 0.33 |
|  | 25 | 0.1 | 0.34 | 0.44 | 0.51 | 0.57 |
| Content of extractables, % by weight | 5 | 1.0 | 0.76 | 0.8 | 1.1 | 1.5 |
|  | 25 | 1.55 | 1.1 | 1.2 | 1.44 | 1.7 |

The invention in its broad aspects is not limited to the specific details shown and described and departures may be made from such details without departing from the principles of the invention and without sacrificing its chief advantages.

What is claimed is:

1. A photodegradable polymer composition comprising at least one polymer selected from the group consisting of polyethylene and polystyrene and copolymers thereof and from 1 to 500 ppm based on the polymer of ferrous iron in the form of a salt of a carboxylic acid, said acid having an alkyl chain containing at least 6 carbon atoms and being substituted in at least one of the second, third, fourth or fifth positions relative to the acid group with at least one of the radicals selected

TABLE II

| Example No. | Time (minutes) | | | | | | |
|---|---|---|---|---|---|---|---|
|  | 0 | 5 | 10 | 20 | 30 | 40 | 50 |
| 18 (Control) | 1.9 | 1.85 | 1.78 | 1.55 | 1 | 0.5 | crosslinked |
| 18 | 1.85 | 1.89 | 1.90 | 1.79 | 1.40 | 0.88 | 0.5 |
| 19 | 1.8 | 1.91 | 1.94 | 1.80 | 1.56 | 1.18 | 0.8 |
| 20 | 1.9 |  |  |  | 1.85 |  |  |
| 21 | 1.9 |  |  |  | 1.7 |  | 1.65 |
| 22 | 1.95 | 1.89 | 1.65 | 1.01 | 0.60 | 0.35 | 0.20 | from the group consisting of carboxylic acid, sulphonic acid, alcohol and amide radicals.

2. The composition according to claim 1, that also contains from 1 to 250 ppm of sulphur based on the polymer.

3. The polymer composition of claim 1, containing from 10 to 150 ppm of the ferrous iron.

4. The polymer composition of claim 1, in which the ferrous salt is selected from the group consisting of iron-(II) dodecylsuccinate, iron-(II) O-palmitoyl-1-ascorbate, iron-(II) monolaurylethanolamide sulphosuccinate, iron-(II) monostearylsulphosuccinate, iron-(II) N-palmitoyl-glutamate, iron-(II) N lauroylaspartate, iron-(II) 2-sulphopalmitate and iron-(II) O-palmitoyl-gluconate.

5. The polymer composition of claim 1, in which the polymer is polyethylene.

6. The polymer composition of claim 1, in which the polymer is polystyrene.

* * * * *